(12) United States Patent
McCarty et al.

(10) Patent No.: US 6,629,229 B1
(45) Date of Patent: Sep. 30, 2003

(54) MESSAGE INDEX DESCRIPTOR

(75) Inventors: Christopher J. McCarty, Colorado Springs, CO (US); Stephen B. Johnson, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 349 days.

(21) Appl. No.: 09/864,760

(22) Filed: May 24, 2001

(51) Int. Cl.[7] .............................................. G06F 12/02
(52) U.S. Cl. ...................... 711/202; 711/206; 711/207; 711/203; 709/238; 709/239; 709/314
(58) Field of Search ......................... 711/200–203, 206, 711/207; 709/238, 239, 314

(56) References Cited

U.S. PATENT DOCUMENTS

| | | | | |
|---|---|---|---|---|
| 4,922,503 A | * | 5/1990 | Leone ........................ | 370/402 |
| 5,430,850 A | * | 7/1995 | Papadopoulos et al. ..... | 709/314 |
| 5,737,525 A | * | 4/1998 | Picazo, Jr. et al. .......... | 709/249 |
| 5,835,925 A | * | 11/1998 | Kessler et al. ................. | 711/2 |
| 5,864,738 A | * | 1/1999 | Kessler et al. .............. | 709/239 |
| 5,999,518 A | * | 12/1999 | Nattkemper et al. ........ | 370/258 |
| 6,185,620 B1 | * | 2/2001 | Weber et al. ................ | 709/230 |

* cited by examiner

Primary Examiner—T. V. Nguyen
(74) Attorney, Agent, or Firm—Christopher P. Maiorana, P.C.

(57) ABSTRACT

A circuit comprising a memory, a queue, and a translator. The memory may be configured to store a message at an address at least as great as a base address. The queue may be configured to store a descriptor, wherein the descriptor is configured to have (i) an index, (ii) a routing field, and (iii) fewer bits than the address. The translator may be configured to translate between the address and the index.

20 Claims, 3 Drawing Sheets

FIG._1
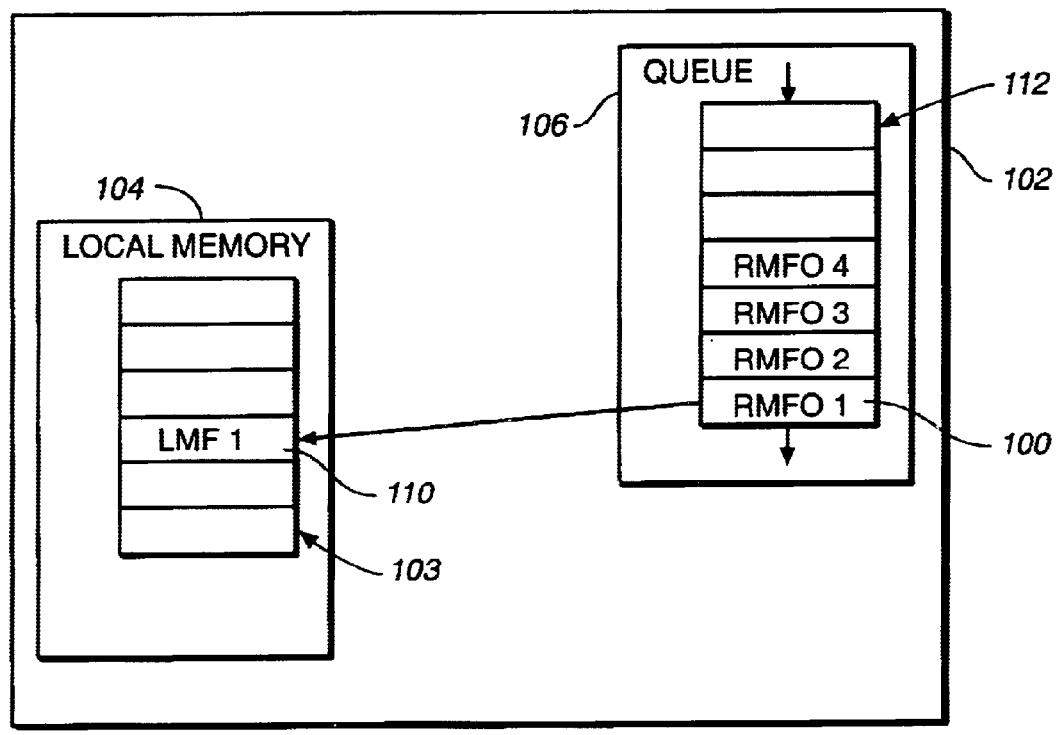
FIG._2

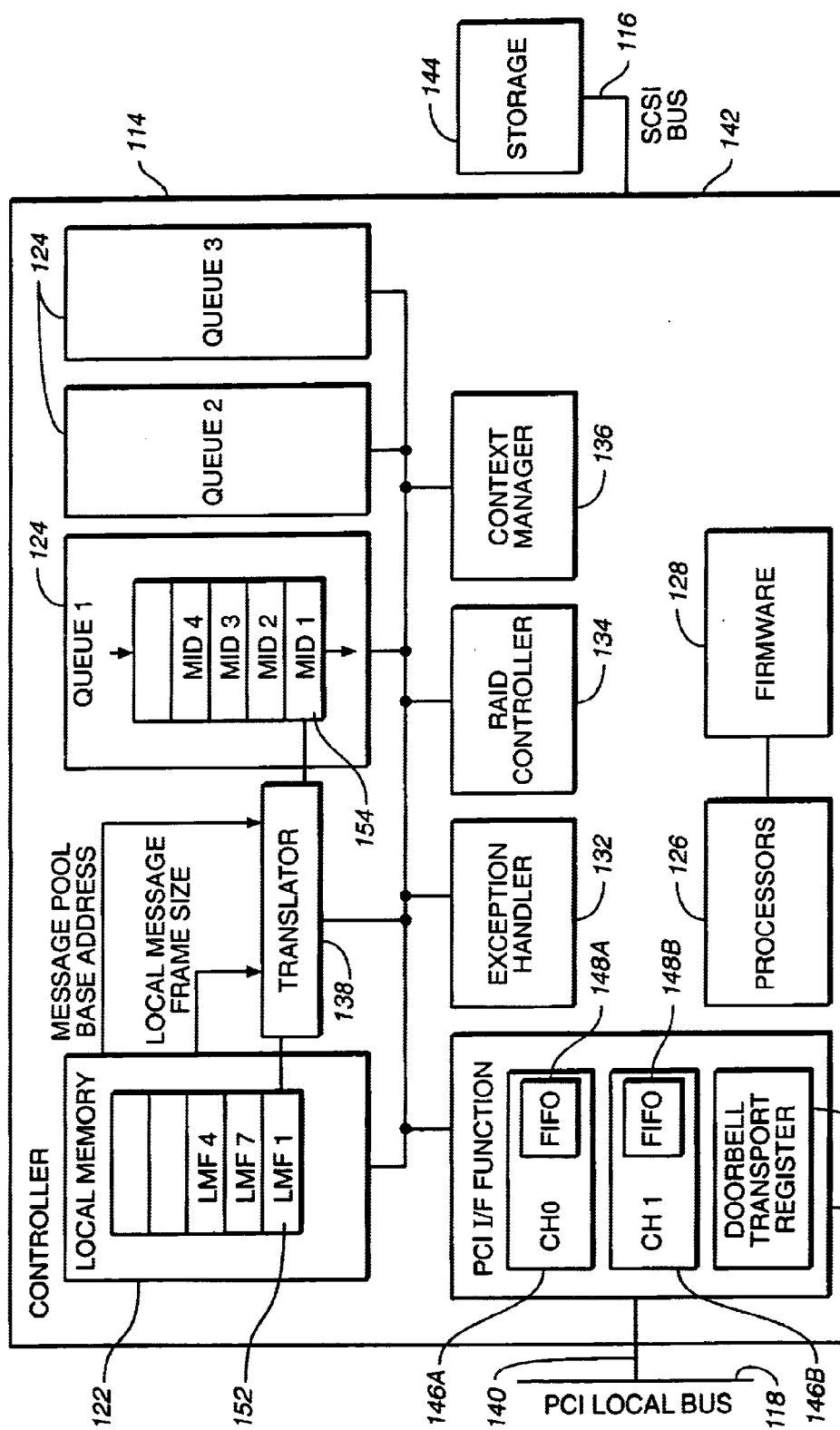
FIG._3

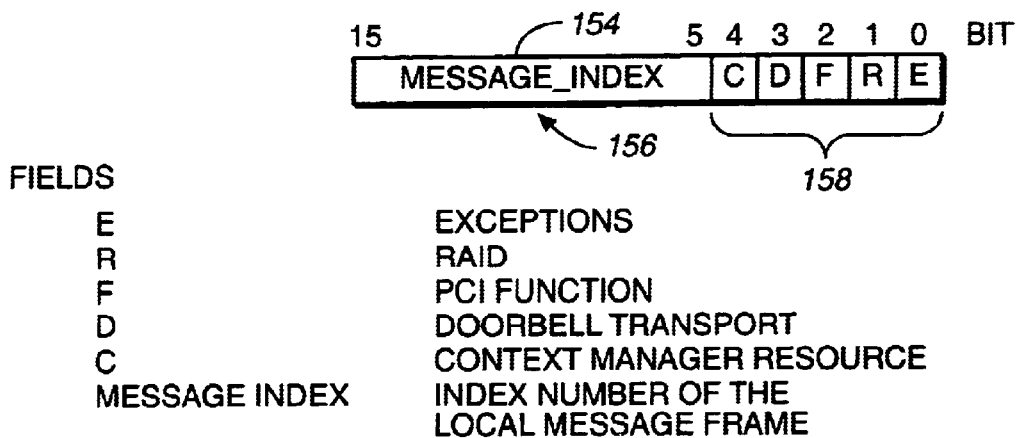
FIG._4
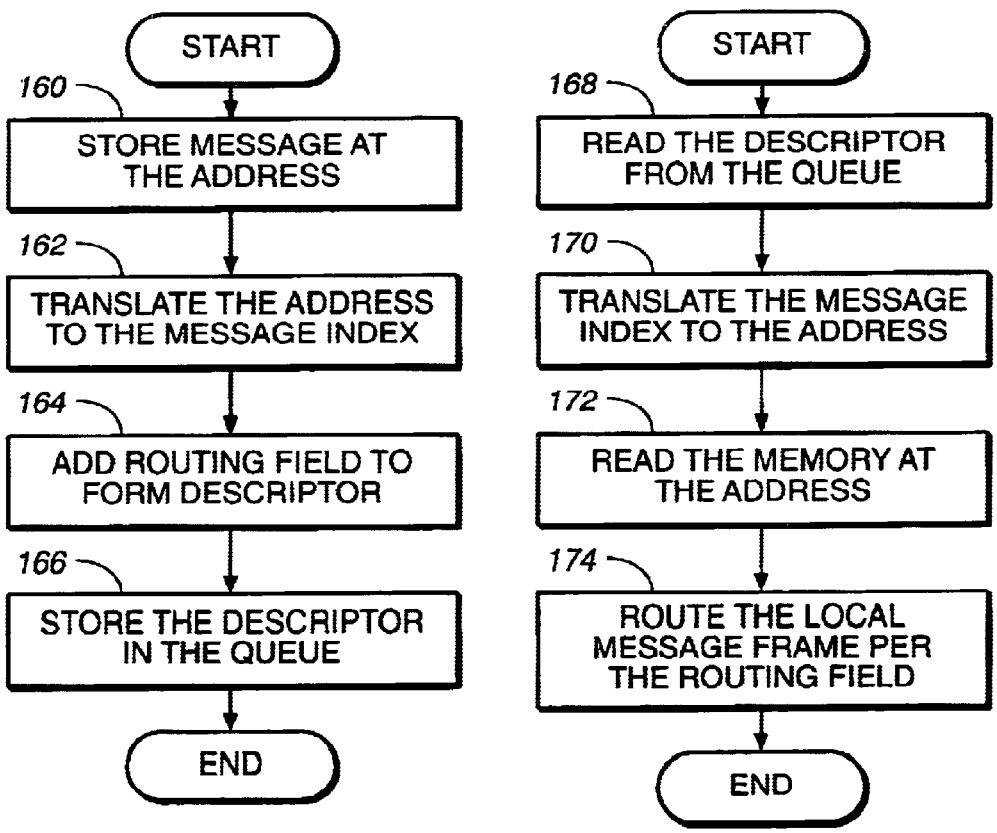
FIG._5   FIG._6

MESSAGE INDEX DESCRIPTOR

FIELD OF THE INVENTION

The present invention relates to a method and/or architecture for bus controllers generally and, more particularly, to embedded firmware on a small computer system interface controller.

BACKGROUND OF THE INVENTION

Modern Small Computer System Interface (SCSI) controller designs incorporate multiple processors that allow several tasks to be performed simultaneously. Firmware executing on the processors communicate with each other by passing pointers around that point to messages that describe the input/output data. The messages are stored in a local memory having a 32-bit addressing scheme. Since the messages are longer than 32 bits, they may be stored as a local message frame (LMF) starting at a local message frame address (LMFA).

Pointers are used to show the firmware where the local message frames 152 are stored in the local memory. Referring to FIG. 1, a diagram of a pointer 100 is shown. The pointer 100 is referred to as a request message frame descriptor (RMFD). Each pointer 100 stores a 32-bit LMFA. The LMFA is an absolute address of a first word of the LMF.

Referring to FIG. 2, a block diagram of a conventional controller 102 is shown. The conventional controller has a local memory 104 and a queue 106. The local memory 104 is divided into frames 108 or blocks. Each frame 108 contains an LMF 110. The queue 106 is divided into multiple 32-bit words 112. Each word 112 stores an RMFD or pointer 100.

Inefficiency is created by storing the RMFDs as 32-bit words. The 32-bit RMFDs allows 4 billion unique locations to be addressed in the local memory 104. The local memory 102 is not made this large due to power, space, and cost considerations. Likewise, the queues 106 have a fixed amount of capacity for reasons of power, space, and cost. In practice, a capacity of the queue 106 has become a limiting factor in a number of the LMFs 110 that the conventional controller 102 can process.

SUMMARY OF THE INVENTION

The present invention concerns a circuit comprising a memory, a queue, and a translator. The memory may be configured to store a message at an address at least as great as a base address. The queue may be configured to store a descriptor, wherein the descriptor is configured to have (i) an index, (ii) a routing field, and (iii) fewer bits than the address. The translator may be configured to translate between the address and the index.

The objects, features and advantages of the present invention include providing a method and/or architecture for embedded firmware on a SCSI bus controller that may (i) reduce memory capacity and/or (ii) improve performance.

BRIEF DESCRIPTION OF THE DRAWINGS

These and other objects, features and advantages of the present invention will be apparent from the following detailed description and the appended claims and drawings in which:

FIG. 1 is a diagram of a conventional descriptor;

FIG. 2 is a block diagram of a conventional controller;

FIG. 3 is a block diagram of a controller implementing the present invention;

FIG. 4 is a diagram of a message index descriptor;

FIG. 5 is a flow diagram of a method or generating a message index descriptor for a local message frame; and FIG. 6 is a flow diagram of a method of accessing a local message frame from a message index descriptor.

DETAILED DESCRIPTION OF THE PREFERRED EMBODIMENTS

Referring to FIG. 3, a block diagram of a controller 114 (or circuit) is shown in accordance with a preferred embodiment of the present invention. The controller 114 may be implemented as a Small Computer System Interface (SCSI) controller for a SCSI bus 116. The SCSI standard is defined by ANSI specification X3.131-1986, American National Standard Institute, New York, N.Y., U.S.A., and is hereby incorporated by reference in its entirety. The controller 114 may also interface to a Peripheral Component Interconnect (PCI) local bus 118. The PCI local bus 118 is defined by the PCI Local Bus specification, Intel Corporation, Santa Clara, Calif., U.S.A., and is hereby incorporated by reference in its entirety. Other bus standards may be implemented to meet the design criteria of a particular application.

Other standards that may be implemented include, but are not limited to, InfiniBand™, Peripheral Component Interconnect Extension (PCI-X), AT Attachment (ATA), Serial ATA, and Fibre Channel. The InfiniBand™ standard is defined by the InfiniBand Specification Release 1.0, InfiniBand$^{SM}$ Trade Association, Portland, Oreg., U.S.A., and is hereby incorporated by reference in its entirety. The PCI-X standard is defined by the PCI-X Specification Rev 1.0a, PCI-Special Interest Group, Portland, Oreg., U.S.A., and is hereby incorporated by reference in its entirety. The ATA standards are defined by the specifications ANSI NCITS 340-2000, ANSILNCITS 317-1998, and ANSI X3.298-1997, American National Standard Institute, New York, N.Y., U.S.A., and are hereby incorporated by reference in their entirety. The Fibre Channel standard is defined by the specification ANSI X3.230-1994, American National Standard Institute, New York, N.Y., U.S.A., and is hereby incorporated by reference in its entirety.

The controller 114 generally comprises a PCI interface function 120, a local memory 122, one or more queues 124, and one or more processors 126. The processors 126 may execute firmware 128 that may implement an exception handler 132, a RAID (Redundant And Inexpensive Disk) controller 134, a context manager 136, and a translator 138. The controller 114 may have an interface 140 to connect to the PCI local bus 118. The controller 114 may have another interface 142 to connect to the SCSI bus 116. One or more storage devices 144 may be connected to the SCSI bus 116.

Data is generally exchanged between the controller 114 and the PCI local bus 118 through the PCI interface function 120. The PCI interface function 120 may be implemented as one or more channels 146. For example, the PCI interface function 120 may be implemented as a first channel 146A (e.g., CH0) and as a second channel 146B (e.g., CH1). Each channel 146A–B may contain a FIFO 148A–B to queue messages presented to and received from the PCI local bus 118. The PCI interface function 120 may also include one or more doorbell transport registers 150. The doorbell transport register 150 may be used as a high priority path around FIFOs 148A–B.

The local memory 122 generally provides storage for local message frames 152. The local message frames 152 generally comprise many bytes of information per frame. A local message frame size parameter may convey the number of bytes per local message frame 152. A practical value for the local message frame size may be 64 bytes. Other frame sizes may be implemented to meet the design criteria of a particular application.

The local message frames 152 are generally stored in the local memory 122 starting at a predetermined address (e.g., a message pool base address). The message pool base address may be aligned to a natural boundary of the local memory 122 divided by the local message frame size. The local message frame size may also be aligned to a natural word boundary of local memory 122. In one embodiment, the local memory 122 may be organized as 32-bit words. Other widths of the local memory 122 may be implemented in accordance with a design criteria of a particular application.

Each queue 124 may be implemented as a multiple-bit wide memory. Each word of the queues 124 may be configured to store a message index descriptor 154. In one example, the queues 124 and the message index descriptors 154 may have a 16-bit width. Other widths of the queues 124 and the message index descriptors 154 may be implemented to meet the design criteria of a particular application. Each message index descriptor 154 generally references a local message frame 152 within the local memory 122.

The translator 138 generally provides for translation between the addresses of the local message frames .152 and the message index descriptors 154. Translations between the addresses and the message index descriptors 154 are generally based upon the message pool base address and the local message frame size.

The context manager 136 may provide data exchanges between the controller 114 and a storage device 144 on the SCSI bus 116. The context manager 136 may have a dedicated queue 124 for internal use. The dedicated queue 124 may contain message index descriptors 154 that point to special local message frames 152 used by the context manager 136. The context manager 136 may present a signal (e.g., E) to indicate a status of each data transfer. The signal E may have an inactive state when the data transfer is successful. The signal E may have an active state when the data transfer has failed and/or some other exception has occurred.

The exception handler 132 generally provides for recovery from exception events. The exception handler 132 may be invoked or activated when the signal E is in the active state for the respective local message frame 152.

The RAID controller 134 may provide functionality to interface with an array of storage devices 144 on the SCSI bus 116. The RAID controller 134 may be configured to operate with RAID0, RAID1, RAID2, RAID3, RAID4, and RAID5 type storage devices 144. Other RAID types may be implemented to meet the requirements of a particular implementation.

Referring to FIG. 4, a diagram of a message index descriptor 154 is shown. The message index descriptor 154 generally comprises an index field 156 and a routing field 158. The index field 156 may be used to generate an address that points to a local message frame 152 stored in the local memory 122. The routing field 158 may be used by the firmware 128 to do quick checks. For example, the routing fields 158 may identify where the local message frames 152 originated, where the local message frames 152 are destined, or what type of information is stored in the local message frames 152. The routing field 158 generally allows the firmware 128 to process the local message frame 152 much faster than if the information within the routing field 158 were stored within a different structure.

The index field 156 may-be filled with a signal (e.g., MESSAGE_INDEX) by the translator 138 using the address, local message frame size, and the message pool base address. The signal MESSAGE_INDEX may be determined by subtracting the message pool base address from the address of the local message frame 152 and then dividing the results by the message frame size. By limiting the maximum value of the address, a minimum value of the message pool base address, and a minimum value for the message frame size, the signal MESSAGE_INDEX may have a maximum value significantly less than the address for any given local message frame 152. For example, given a 32-bit address and a 64-byte message frame size, then the signal MESSAGE_INDEX may fit within the index field 156 using only 11 bits.

As an option, the translation may continue by shifting the signal MESSAGE_INDEX left within the message index descriptor 154 to left-justify the signal MESSAGE_INDEX within the index field 156. For example, if the signal MESSAGE_INDEX is 11-bits wide and the message index descriptor 154 is 16-bits wide, then the signal MESSAGE_INDEX may be shifted left by 5 bits. Any position of the index field 156 within the message index descriptor 154 may be chosen to meet the design criteria of a particular application. For example, the index field 156 may be right-justified within the message index descriptor 154.

To translate from the signal MESSAGE_INDEX to the address, the above described process is reversed. The signal MESSAGE_INDEX may by shifted right within the message index descriptor 154, if necessary. The signal MESSAGE_INDEX may then be multiplied by the message frame size. The resulting product may then be added to the message pool base address to obtain the address for the local message frame 152.

The routing field 158 may include one or more signals. The routing field 158 may include a signal (e.g., C). The routing field 158 may include a signal (e.g., D). The routing field 158 may include another signal (e.g., F). The routing field 158 may include a signal (e.g., R). The routing field 158 may include the signal E.

The signal E may be implemented as an exception signal. The context manager 136 may generate the exception signal E any time the local message frame 152 experiences anything other than a successful transfer. The exception signal E may have an inactive state that indicates that the local message frame 152 was successfully transferred. The exception signal E may have an active state that indicates that an exception has occurred.

The signal R may be implemented as a RAID signal. The signal R generally informs the firmware 128 whether or not the local message frame 152 is associated with a RAID function or not. The signal R may have a true state to indicate that the local message frame 152 should be handled by a RAID controller 134. The signal R may have a false date to indicate that the local message frame 152 does not require involvement by the RAID controller 134.

The signal F may be implemented as a PCI function signal. The signal F generally indicates which channel of the PCI interface function 120 that a local message frame 152 is associated with. In one embodiment, the signal F may be implemented as a single bit. The signal F may have a "zero" state to indicate that the local message frame 152 is associated with the first channel 146A. The signal F may have a "one" state to indicate that the local message frame 152 is associated with the second channel 146B. In another embodiment, the signal F may be implemented as a multi-bit signal to account for more than two channels 146 in the PCI interface function 120. If the PCI interface function 120 is implemented as a single channel 146, then the signal F may be unused or eliminated.

The signal D may be implemented as a doorbell transport signal. The signal D generally flags the local message frame 152 as associated with the doorbell transport register 150. The signal D may have a true state to indicate that the local message frame 152 was received from and should be returned to the doorbell transport register 150. The signal D may have a false state to indicate that the local message frame 152 is associated with one of the FIFOs 148A–B.

The signal C may be implemented as a context manager resource signal. The signal C generally associates the local message frame 152 with the context manager 136. The signal may have a true state to indicate that the local message frame 152 is a special frame to be used only by the context manager 136. The signal C may have a false state to indicate that the local message frame 152 is not a special frame for use exclusively by the context manager 136.

The sum of the index field 156 and the routing field 158 may produce a message index descriptor 154 having 16 bits. The message index descriptor 154 may be made smaller by reducing a size of the signal MESSAGE_INDEX and/or eliminating one or more of the signals stored in the routing field 158. The message index descriptor 154 may be expanded by increasing the size of the signal MESSAGE_INDEX, expanding one or more of the signals stored in the routing field 158, or by adding new signals to the routing field 158. By implementing the message index descriptors 154 as half the size as the conventional local message frame address, the controller 114 may be able to queue twice as many message index descriptors 154 as conventional local message frame addresses. Likewise, the controller 114 may be implemented with half the queue size and still store the same number of message index descriptors 154 as the conventional local message frame addresses.

Referring to FIG. 5, a flow diagram of a method for generating a message index descriptor 154 is shown. The process may begin with a local message frame 152 being stored in the local memory 122 at an address (e.g., block 160). The translator 138 may then translate the address into the signal MESSAGE_INDEX (e.g., block 162). The signals of the routing field 158 may then be appended to the signal MESSAGE_INDEX to form the message index descriptor 154 (e.g., block 164). The message index descriptor 154 may then be stored in the queue 124 (e.g., block 166).

Referring to FIG. 6, a flow diagram of a method for using the message index descriptors 154 is shown. The process may begin by reading the message index descriptor 154 from the queue 124 (e.g., block 168). The translator 138 may then translate the signal MESSAGE_INDEX into the address (e.g., block 170). The local message frame 152 may then be read from the local memory 122 using the address (e.g., block 172). The local message frame 152 may then be routed in accordance with the routing field 158 of the message index descriptor 154 (e.g., block 174).

The function performed by the flow diagrams of FIGS. 5 and 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a memory configured to store a message at an address at least as great as a base address;
   a queue configured to store a descriptor, wherein said descriptor is configured to have (i) an index, (ii) a routing field, and (iii) fewer bits than said address; and
   a translator configured to translate between said address and said index.

2. The circuit according to claim 1, wherein said translator is configured to translate between said address and said index as a function of said base address and a message frame size of said message.

3. The circuit according to claim 2, wherein said translator is further configured to shift said index within said descriptor as part of said translation.

4. The circuit according to claim 1, further comprising an exception handler, wherein said routing field includes an exception signal for notifying said exception handler.

5. The circuit according to claim 1, further comprising a disk controller, wherein said routing field includes a disk signal for routing said message to said disk controller.

6. The circuit according to claim 5, wherein said disk controller is a RAID controller.

7. The circuit according to claim 1, further comprising a channel interface configured as a plurality of channels, wherein said routing field includes a channel signal that distinguishes said channels.

8. The circuit according to claim 1, further comprising a register configured to receive said message, wherein said routing field includes a register signal that indicates that said message was received through said register.

9. The circuit according to claim 8, wherein said register is a doorbell transport register.

10. The circuit according to claim 1, further comprising a context manager, wherein said routing field includes a context manager signal that associates said message with said context manager.

11. The circuit according to claim 1, further comprising:
    an exception handler;
    a disk controller;
    a context manager;
    a channel interface configured as a plurality of channels; and a register configured to receive said message, wherein said routing field includes (i) an exception signal for notifying said exception handler, (ii) a disk signal for routing said message to said disk controller, (iii) a context manager signal that associates said message with said context manager, (iv) a channel signal that distinguishes said channels, and (v) a register signal that indicates that said message was received through said register.

12. A method-of queuing a message, the method comprising the steps of:

(A) storing said message in a memory at an address at least as great as a base address;

(B) translating said address into an index in response to step (A);

(C) storing said index in a queue as part of a descriptor, wherein said descriptor is configured to have (i) said index, (ii) a routing field, and (iii) fewer bits than said address in response to step (B).

13. The method according to claim 12, wherein said translating is a function of said base address and a message frame size of said message.

14. The method according to claim 12, wherein step (B) comprises the sub-step of shifting said index within said descriptor.

15. The method according to claim 12, further comprising the step of notifying an exception handler in response to an exception signal within said routing field.

16. The method according to claim 12, further comprising the step of routing said message to a disk controller in response to a disk signal in said routing field.

17. The method according to claim 12, further comprising the step of distinguishing a plurality of channels in response to a channel signal within said routing field.

18. The method according to claim 12, further comprising the step of associating said message with a register is response to a register signal within said routing field.

19. The method according to claim 12, further comprising the step of associating said message with a context manager in response to a context manager signal within said routing field.

20. A circuit comprising:

means for storing a message at an address at least as great as a base address;

means for translating said address into an index;

means for storing said index as part of a descriptor, wherein said descriptor is configured to have (i) said index, (ii) a routing field, and (iii) fewer bits than said address.

* * * * *